Nov. 1, 1932.                M. REHSE                1,885,140
SUBMERGED ALTERNATING CURRENT DRIVE
Filed Oct. 22, 1927        2 Sheets-Sheet 1
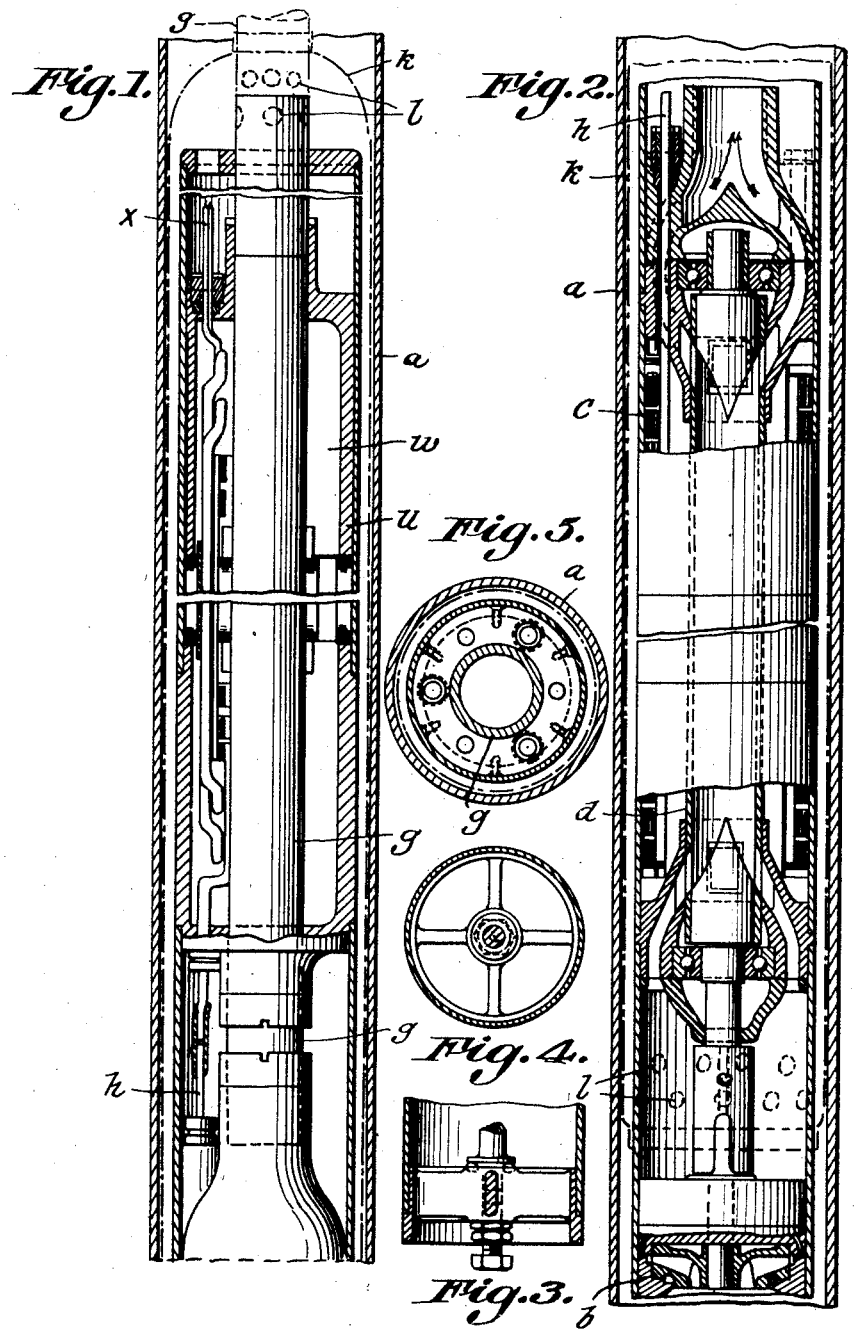

Nov. 1, 1932. M. REHSE 1,885,140
SUBMERGED ALTERNATING CURRENT DRIVE
Filed Oct. 22, 1927 2 Sheets-Sheet 2
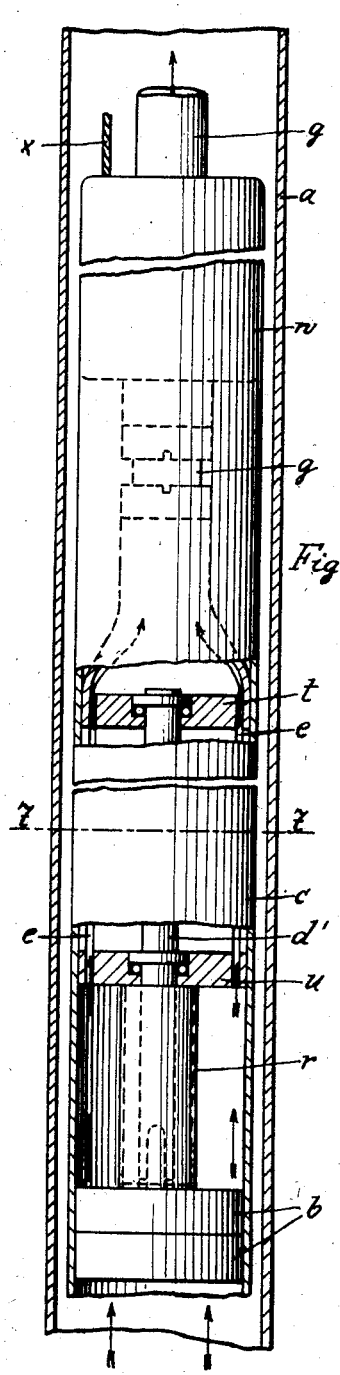
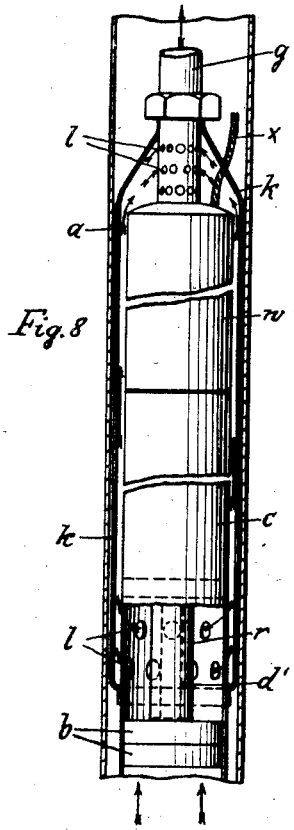
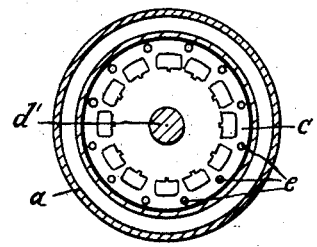
Inventor
Matthias Rehse
By B. Singer, atty.

Patented Nov. 1, 1932

1,885,140

UNITED STATES PATENT OFFICE

MATTHIAS REHSE, OF ROTENHAHN NEAR VOORDE, HOLSTEIN, GERMANY

SUBMERGED ALTERNATING CURRENT DRIVE

Application filed October 22, 1927. Serial No. 228,089.

The well-known alternating current motors running under water, so-called submerged motors, are usually protected by stuffing boxes, air chamber, compressed air, oil filling or other sealing means for the purpose of preventing short-circuit due to moisture owing to penetration of the liquid being pumped. All these sealing means have the disadvantage that they deteriorate and from time to time must be renewed or filled up, since in operation both air as well as oil escapes with the liquid being pumped so that an absolute security against short-circuit is not provided; controlling devices are necessary to indicate the level of the fillings and the motors can not be used for pumping drinking water on account of the contamination with the water thereby caused.

The present invention provides an underground pumping set consisting of an electric motor with centrifugal pump for artesian wells, shafts or the like underground installations in which the electric motor is protected against short-circuit neither by stuffing boxes nor by oil or compressed air filling but only by a low tension current of about 14 to 50 volts, the high voltage of the system being converted to low voltage by means of a transformer which is of tubular form and capable of being submerged below water and is enclosed so as to be water-tight, mounted above the ground when the depth of the bore hole is small and arranged directly above the electric motor at great depths. The individual coils of the stator winding do not consist, as in the case of a motor taking the supply system voltage, of many wires which are covered two or more times with cotton but either only of a single copper or other metal rod which is only covered once with cotton or of aluminium wire on which a natural oxidation takes place, no cotton insulation being required. The windings constitute a natural patina by means of which the motor is automatically protected against short-circuit, the capacity for resistance of the natural oxidation continually increasing while that of artificial insulation of the windings would diminish, as is well-known, in the same degree.

That is to say, the motor is guarded against short circuit under water by the fact that current of very low voltage is being used. But this safeguard is strengthened substantially by the condition that the windings which have no artificial insulation receive a sort of natural insulation owing to the formation of a layer of oxide thereon. This natural protective layer also prevents the mixture from being short circuited while on the other hand any artificial insulation of the wires would be subjected to wear under water and would, therefore, eventually cause insufficiency.

The advantage hereby attained resides in the feature that the winding need not be insulated and made insensitive to moisture by india-rubber, shellac or the like solutions and the covering of the coil wires with a multiple winding of cotton can be dispensed with, whereby much more space is obtained and therefore much more copper can be inserted in the given slot space, which in this case is formed corresponding to the profile of the rods, and with the same packing breadth and rotor length double the horsepower can be obtained as compared with the motor connected directly to the system. Further owing to the omission of the oil fillings, the set can also be employed for supplying drinking water since contamination by oil and fat can no longer occur. Finally the pumped liquid, water, oil, caustic solution and the like, can be led through or around the motor for cooling it and the transformer can be arranged directly above the motor which then is continuously washed over by the pumped liquid and cooled so that losses owing to heating of the windings are avoided. As current supply leads high tension cables are employed so that the set can be sunk with the transformer to the greatest depths employing small cross-section of cable, whereas previously, on account of the increasing cable cross-section and weight with diminishing voltage indispensable in the case of tubular wells of great depth, this was impossible because the thick cables diminished the free cross-section too much. The fact that by using low tension current, a short rotor is obtained whereby the construction of an electric motor for artesian wells down to three inches diameter is made possible for the first time, should also be mentioned.

In the drawings a constructional example of the invention is represented wherein Fig. 1 is a longitudinal section through the transformer, Fig. 2 a longitudinal section through the motor with pump, Fig. 3 a longitudinal section through the lower thrust ball bearing, Fig. 4 a top view of the lower ball bearing, Fig. 5 a top view of the transformer, Fig. 6 is partly an elevation and partly a section of a modified form of the apparatus in which the motor shaft is solid, Fig. 7 is a transverse sectional view of the same on the plan indicated by the line 7—7 of Fig. 6, Fig. 8 is a detail elevation partly in section of another modified form of the sheet provided with an excess pressure equalizing cover.

The pump set consists of a casing introduced into the well tube $a$ in which a pump $b$ and an electric motor $c$ are arranged. An ascension pipe $g$ is connected to this casing immediately around which, a second casing $u$ for the transformer $w$ is arranged mounted on the motor casing. In this transformer casing $u$, which is welded or soldered together completely water-tight, is enclosed according to the different distribution systems, a single or two or three-phase transformer $w$. The high tension current is conducted to this transformer $w$ through a high tension cable $x$ and, after conversion, reaches the motor $c$ through a low tension cable $h$. The shaft $d$ of the motor $c$ can be constructed as a hollow shaft or solid shaft (in Fig. 2 the construction is represented as a hollow shaft) according to the diametrical capacity of the external well tube $a$. When a hollow shaft $d$ is used, the pumped liquid is conducted to the ascension pipe $g$ through same. When a solid motor shaft is used as shown at $d'$ in Figures 6, 7 and 8 the pumped liquid is conducted to the ascension pipe $g$ directly through a number of small tubes or grooves in the laminations built into the stator windings of the stator of the motor $c$ and which are soldered or stamped in the lower and upper casing covers. If enough space is provided, the set may be surrounded as shown in Figure 8 with an excess pressure equalizing cover $k$ and the pumped liquid, for example, water, is forced through the holes $l$ in the motor casing and ascension pipe $g$ around the motor and transformer casing $u$, whereby the motor $c$ as well as the transformer $w$ are cooled from the inside and the outside. The transformer casing $u$ is provided, also in well-known way, with a number of equalizing tubes by means of which the expansion of the oil filling or the pressure arising in the case of temperature fluctuations is taken up.

By the arrangement of transformer $w$ directly above the motor and operation of the motor $c$ by a lower tension current than normal, the pumped liquid can be conducted without regard to short-circuit by contact of the windings with water both through as well as around the motor $c$ whereby the motor $c$ and transformer $w$ are cooled on all sides. In the case of drinking water supply, the excess pressure equalizing cover $k$ can be omitted and the water sent directly through the motor $c$ and transformer $w$ or through the motor $c$ and around the transformer $w$ and employing the excess pressure equalizing cover $k$ also about the motor $c$ and transformer $w$, whereas in the case of oil supply in order to prevent the motor $c$ getting choked up, the pumped liquid is conducted only through the hollow space between motor casing and excess pressure equalizing cover $k$, that is around the motor $c$ and transformer $w$. By this means the lower bearing of the shaft $d$ of the motor $c$ is protected from foreign bodies by means of a pipe led down to the pump and the ascension pipe $g$ is connected directly to the excess pressure equalizing cover $k$. In the transformer casing $u$, the hollow space for the ascension pipe $g$ can be omitted and the transformer core shape may be other than that shown.

I claim:—

A well pump aggregate comprising a low voltage alternating current motor having an open stator and an open motor, a water discharge pipe extending upwardly above the motor and a transformer mounted above and forming a set with the motor and through which said pipe extends, said transformer being adapted to convert high voltage into low voltage for the motor so that the water being pumped acts as insulating material and also for cooling the motor and so that the transformer winding is cooled both from the inside and the outside and any loss by heat of the current in the winding is compensated for.

In testimony whereof I have affixed my signature.

MATTHIAS REHSE.